(12) United States Patent
Peralta et al.

(10) Patent No.: US 9,377,878 B2
(45) Date of Patent: Jun. 28, 2016

(54) TABLET STYLUS WITH PRESENTATION INTERACTION FUNCTIONALITY

(71) Applicant: ACCO Brands Corporation, Lake Zurich, IL (US)

(72) Inventors: Dominic Peralta, San Mateo, CA (US); Kee Wilcox, San Francisco, CA (US); Barry Marshall, Santa Clara, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 91 days.

(21) Appl. No.: 13/939,773

(22) Filed: Jul. 11, 2013

(65) Prior Publication Data

US 2014/0015812 A1 Jan. 16, 2014

Related U.S. Application Data

(60) Provisional application No. 61/670,551, filed on Jul. 11, 2012.

(51) Int. Cl.
  *G06F 3/0354* (2013.01)
(52) U.S. Cl.
  CPC .... *G06F 3/03545* (2013.01); *G06F 2203/0381* (2013.01); *G06F 2203/0382* (2013.01); *G06F 2203/0383* (2013.01); *G06F 2203/0384* (2013.01)
(58) Field of Classification Search
  CPC .. G06F 3/03545; G06F 2203/0381–2203/0384
  USPC ............................ 361/679.01, 679.4; 345/179
  See application file for complete search history.

(56) References Cited

U.S. PATENT DOCUMENTS

| | | | |
|---|---|---|---|
| 4,387,718 A | 6/1983 | Bilitz et al. | |
| 4,855,746 A | 8/1989 | Stacy | |
| 4,883,926 A * | 11/1989 | Baldwin | 178/19.01 |
| 5,803,582 A | 9/1998 | Huang | |
| 6,304,249 B1 | 10/2001 | Derocher et al. | |
| 7,161,578 B1 * | 1/2007 | Schneider | 345/156 |
| 7,248,201 B2 | 7/2007 | Buccinna et al. | |

(Continued)

FOREIGN PATENT DOCUMENTS

WO 2012100523 2/2012

OTHER PUBLICATIONS

"Battery Charging Specification", Dec. 7, 2010, USB Implementers Forum, Inc., revision 1.2, pp. 1 & 6-7.*

(Continued)

*Primary Examiner* — David Tung
(74) *Attorney, Agent, or Firm* — Michael Best & Friedrich LLP (57) ABSTRACT

A handheld apparatus includes a body including a laser portion having a laser lens, a stylus portion having a conductive tip, and a connection portion coupled to the laser portion and the stylus portion. The connection portion has a charging port. The laser portion and the stylus portion are movable relative to each other between a first position, in which at least one of the laser portion and the stylus portion covers the charging port of the connection portion, and a second position, in which the charging port of the connection portion is exposed. The handheld apparatus also includes a power source positioned within the body and coupled to the charging port, and a laser module positioned within the laser portion. The laser module is operable to output a directed laser through the laser lens.

17 Claims, 5 Drawing Sheets

(56) References Cited

U.S. PATENT DOCUMENTS

| | | | |
|---|---|---|---|
| 7,817,137 | B2 | 10/2010 | Wang |
| 8,352,041 | B2 | 1/2013 | Das et al. |
| 2003/0043111 | A1 | 3/2003 | Huang |
| 2005/0012594 | A1 | 1/2005 | Shim |
| 2005/0246458 | A1* | 11/2005 | Kavanagh ............. 710/62 |
| 2008/0065806 | A1 | 3/2008 | Kim et al. |
| 2009/0240240 | A1 | 9/2009 | Hines et al. |
| 2009/0257223 | A1* | 10/2009 | Liu ..................... 362/206 |
| 2010/0007517 | A1 | 1/2010 | Andrews et al. |
| 2012/0013578 | A1* | 1/2012 | Huang et al. ......... 345/179 |
| 2013/0343042 | A1* | 12/2013 | Windom ............... 362/183 |

OTHER PUBLICATIONS

Kensington, "SlimBlade™ Bluetooth Presenter Mouse" <http://www.kensington.com/kensington/us/us/p/1594/K72330US/slimblade%E2%84%A2-bluetooth-presenter-mouse.aspx> webpage available as early as Oct. 16, 2011.

Kensington, "Virtuoso™ Pro Pointer Stylus & Red Laser Pointer" <http://www.kensington.com/kensington/en/gb/p/2836/K39539WW/virtuoso%E2%84%A2-pro-pointer-stylus-red-laser-pointer.aspx> webpage available as early as Jun. 5, 2012.

Targus, "Targus Green Laser Presenter with Multimedia Functions" <http://www.targus.com/us/productdetail.aspx?regionld=7&sku=AMP14USZ&PageName=Presenters> webpage accessed May 13, 2013.

Simplism, "Simplism Japan Dual USB Charger Slide Style, Black" <http://www.drugstore.com/products/prod.asp?pid=386831&catid=283116&aid=338666&aparam=goobase_filler&device=c&network=g&matchtype=> webpage accessed May 14, 2013.

Amazon, "SMK-Link Rechargeable Wireless Presenter Remote and Mouse (VP6700)" <http://www.amazon.com/SMK-Link-Rechargeable-Wireless-Presenter-VP6700/dp/B00112BK0A/ref=sr_1_2?s=electronics&ie=UTF8&qid=1368513358&sr=1-2&keywords=rechargeable+wireless+presenter> webpage available as early as Feb. 13, 2012.

Brandeditems, "Laser Pointer LED USB Flash Drive" <http://www.brandeditems.com.ar/technology_products.php?id=398&kateg=1> webpage accessed May 14, 2013.

Hde, "Red 3-in-1 Stylus, Red Laser Pointer, & LED Light" <http://www.shophde.com/j108.html> webpage available as early as Aug. 15, 2007.

Hde, "Black 4-in-1 Stylus, Pen, Laser Pointer, & LED Light" <http://www.shophde.com/j110.html> webpage available as early as Jun. 5, 2012.

Amazon, "VSON Wireless USB Presentation Remote Clicker Pen" <http://www.amazon.com/Vson-Wireless-USB-Presentation-Remoteclicker/dp/B00F2YAV8K/ref=sr_1_2?ie=UTF8&qid=1381248949&sr=8-2&keywords=vson+wireless+usb+presentation+remote+clicker+pen> webpage available as early as Apr. 16, 2009.

Amazon, "Targus Bluetooth Presenter for Apple Mac AMP11US Wireless laser pointer Mouse" <http://www.amazon.com/Targus-Bluetooth-Presenter-AMP11US-Wireless/dp/B001HQDFGC/ref=sr_1_1?ie=UTF8&qid=1381249241&sr=8-1&keywords=targus+bluetooth+presenter+for+apple+mac+amp11us+wireless+laser+pointer+mouse> webpage available as early as Aug. 31, 2012.

Google, "WebOS Bluetooth Remote Presenter" <http://code.google.com/p/webos-bluetooth-remote-presenter/> webpage available as early as Nov. 17, 2011.

Boxwave, "Presentation Capacitive iPad Stylus" <http://www.boxwave.com/ipad-stylus/presentation-capacitive-ipad-stylus/bwpdd/pww-tmmw/> webpage available as early as Jan. 16, 2011.

Amazon, "RF Wireless Laser Pointer with Page up Down PowerPoint Presentation Function (Black)" <http://www.amazon.com/Wireless-Pointer-PowerPoint-Presentation-Function/dp/B002SDT3IC/ref=sr_1_1?ie=UTF8&qid=1381251609&sr=8-1&keywords=rf+wireless+laser+pointer> webpage available as early as Feb. 2, 2013.

Amazon, "HP Mogo Bluetooth X54 Presenter Travel Mouse for Laptops" <http://www.amazon.com/HP-Mogo-Bluetooth-X54-Presenter/dp/B004AMRT62/ref=cm_cr_pr_pb_t> webpage available as early as Sep. 27, 2012.

Multi-Function Co., Ltd., "iPhone Tool Stylus Pen" <http://www.multi-function.net/product_detail.php?idx=39> webpage available as early as Jun. 5, 2012.

Multi-Function Co., Ltd., "Wireless Presentation Pointer With Laser Pointer and USB Flash Drive" <http://www.multi-function.net/product_detail.php?idx=85> webpage available as early as Jun. 5, 2012.

Multi-Function Co., Ltd., "Wireless Presenter With Laser Pointer" <http://www.multi-function.net/product_detail.php?idx=84> webpage available as early as Jun. 5, 2012.

Pollicino, J., "Griffin announces 'Stylus + Pen + Laser Pointer,' gives up on creative product names" <http://www.engadget.com/2011/09/03/griffin-announces-stylus-pen-laser-pointer-gives-up-on-cr/> webpage available as early as Sep. 3, 2011.

Google, "Interlink Electronics Bluetooth Stopwatch Presenter with Laser Pointer VP4570 Presentation remote control—Bluetooth" <https://www.google.com/#q=interlink+electronics+bluetooth+stopwatch+presenter+with+laser+pointer&tbm=shop> webpage available as early as Aug. 2008.

Google, "Quartet 4 Function Laser Pointer—Laser pointer / ball point pen / LED flashlight / stylus" <https://www.google.com/#q=quartet+4+function+laser+pointer&tbm=shop> webpage available as early as Dec. 2010.

\* cited by examiner

TABLET STYLUS WITH PRESENTATION INTERACTION FUNCTIONALITY

CROSS-REFERENCE TO RELATED APPLICATIONS

This application claims priority to U.S. Provisional Patent Application No. 61/670,551, filed Jul. 11, 2012, the entire contents of which are incorporated by reference herein.

SUMMARY

Embodiments of the present invention relate to compact multi-functional human interface devices. Specifically, embodiments of the present invention comprise the functionality of a presentation or media controller, a stylus for interacting with the display of an electronic device, and a laser pointer, as well as being capable of including other components or devices (e.g. voice recorder, memory stick, etc.). Embodiments of the present invention minaturize the individual functions into a sleek, slender, compact, and user-friendly handheld apparatus.

As tablets and other mobile electronics have grown in popularity, these electronics have become a centerpiece of giving a presentation to a group as well as interacting with customers, clients, peers, and/or suppliers. As such, a need exists for a tool that can be used to interact with a tablet device, control a presentation, and interact with the presentation in a sleek, compact, unobtrusive handheld human interface device.

Embodiments of the present invention address these and other problems, individually and collectively.

In one embodiment, the invention provides a handheld apparatus including a body including a laser portion having a laser lens, a stylus portion having a conductive tip, and a connection portion coupled to the laser portion and the stylus portion. The connection portion has a charging port. The laser portion and the stylus portion are movable relative to each other between a first position, in which at least one of the laser portion and the stylus portion covers the charging port of the connection portion, and a second position, in which the charging port of the connection portion is exposed. The handheld apparatus also includes a power source positioned within the body and coupled to the charging port, and a laser module positioned within the laser portion. The laser module is operable to output a directed laser through the laser lens.

In another embodiment, the invention provides a handheld apparatus including a body including a laser portion having a laser lens, a stylus portion having a conductive tip, a control pad supported by one of the laser portion and the stylus portion, and a connection portion coupled to the laser portion and the stylus portion. The connection portion has a charging port. The laser portion and the stylus portion are slidable relative to each other between a closed position, in which at least one of the laser portion and the stylus portion covers the charging port of the connection portion, and an extended position, in which the charging port of the connection portion is exposed. The handheld apparatus also includes a power source positioned within the body and coupled to the charging port, and a laser module positioned within the laser portion. The laser module is operable to output a directed laser through the laser lens in response to a first input by a user on the control pad. The handheld apparatus further includes a short-range communication module including an antenna, and a computer readable medium coupled to a processor. The computer readable medium includes a presentation control module configured to send a command to an electronic device using the antenna of the short-range communication module in response to a second input by the user on the control pad. The command controls a presentation on the electronic device.

DETAILED DESCRIPTION OF THE INVENTION

Embodiments of the present invention are directed to multi-functional hardware interface devices (e.g. a tablet stylus) that provide fast, easy, and efficient interactions with a wide variety of different devices in a suitable handheld size for holding as a stylus or pen.

The tablet stylus combines the functions of a small profile human interface device controller, a laser presentation controller, a media controller, a pressure sensitive response tip, a proximity detection controller, a gesture controller, or a voice controller into a tablet stylus product. The multi-functional aspects of the table stylus allow the handheld tablet stylus device or apparatus to control and draw on the screen of a tablet while allowing the user to control other functions of the tablet over a short distance (e.g. 10 meters) via a Bluetooth™ connection. Embodiments of the tablet stylus apparatus combine this functionality into a single sleek, small, and slender component body.

Figure 1:
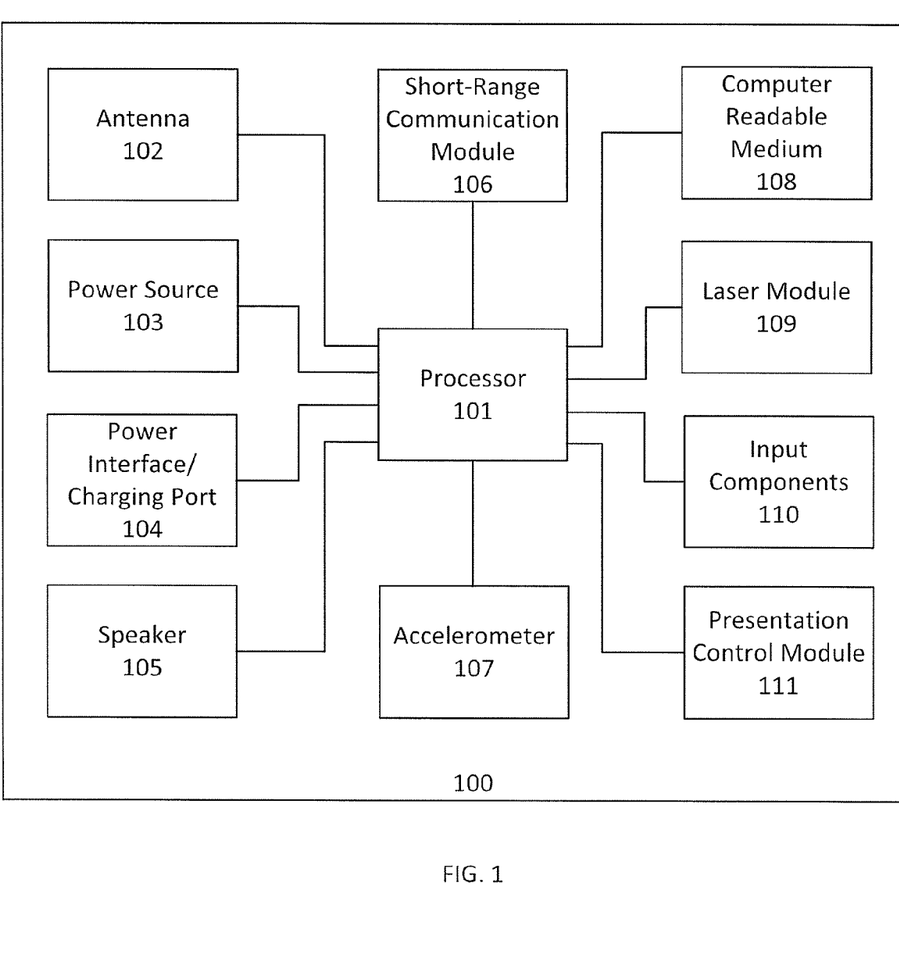
FIG. 1 shows a block diagram of the components in an exemplary embodiment of a tablet stylus with presentation interaction functionality.

FIG. 1 shows a block diagram of the components in an exemplary embodiment of a tablet stylus 100 with presentation interaction functionality. The tablet stylus 100 may comprise a processor 101, antenna 102, power source 103, power interface 104, speaker 105, short-range communication module 106, accelerometer 107, computer readable medium 108, laser module 109, input components 110, and a presentation control module 111.

The short-range communication module may be a Bluetooth™ communication chip or device (e.g. a Bluetooth™ transmitter circuit), a radio frequency (RF) chip, or any other transceiver that is capable of communicating with electronic devices over a short distance (e.g. 10 meters). The short-range communication module may comprise a separate antenna (not shown) from the antenna 102 of the tablet stylus 100 or may use the antenna 102 of the tablet stylus 100 to communicate with other electronic devices (not shown).

The power source 103 may be a rechargable battery with sufficient power storage capability to supply power to the handheld tablet stylus 100 for a week (based on average usage) between charges. The power interface 104 may be an interface for charging the power source 103 from an external power source (not shown). For example, the power interface 104 may be a USB input port as shown in FIGS. 2A-2E. As such, the power interface 104 may be connected to the processor 101 (as shown) but may also be connected to the power source 103 so that energy may be transferred from the power interface 104 and stored in the power source 103. Alternatively, the power source 103 may be replaceable batteries or any other suitable power source as one of ordinary skill would recognize.

The laser module 109 may comprise a chip or device for generating a directed or focused laser that may be directed through a laser lens on the body of the tablet stylus. The laser generated by the laser module 109 may be used as a laser pointer during a presentation. Additionally, an input on the tablet stylus body (e.g. an input on a control pad) may activate and de-activate the laser such that the laser module 109 generates the directed laser or not.

The input components 110 may comprise a power button, a control pad, and a pressure sensitive stylus tip. The control pad may comprise a 4 button presentation controller interface (e.g. a "rocker button"—as shown in FIGS. 2A-2E) or any other suitable number and format of input buttons. The control pad may comprise buttons for undoing or erasing a mark, creating a blank page, annotating a voice into the text, skipping to the next or last page, a laser point trigger button, as well as allow the pen width of the stylus to change based on an input button. Additionally there may be more than one control pad or no control pad and instead input buttons arranged in different areas on the controller. Any other suitable inputs may be implemented depending on the particular functions implemented in the table stylus.

A presentation control module 111 may be implemented either separately within the tablet stylus 100 (as shown) or on the computer readable medium 108 of the tablet stylus 100 (not shown). The presentation control module is configured to communicate with another electronic device and allow a user to control a presentation being provided on the electronic device. The presentation control module may be configured to send commands to the electronic device using the antenna of the short-range communication module or the antenna of the tablet stylus 100 in response to an input by the user on the control pad or through voice commands. The commands may be related to a presentation being performed on the electronic device and may control the presentation such as to skip to the next slide, move to a previous slide, create a new slide, end a presentation, start a video embedded in the presentation, or any other command relevant to a presentation as one of ordinary skill would recognize. Additionally, the commands could be directed to any application on the electronic device and are not limited to slide programs and could be used to generate content on the tablet as well.

Additionally, some embodiments of the tablet stylus 100 may comprise modules and components for wireless proximity detection, a pressure sensitive tip, voice control and voice recording functionality using a microphone, gesture control using an accelerometer 107, or digital note taking using the stylus tip. Additionally, some embodiments allow over-the-air firmware programming to enable user-defined functions.

Figures 2A, 2B:
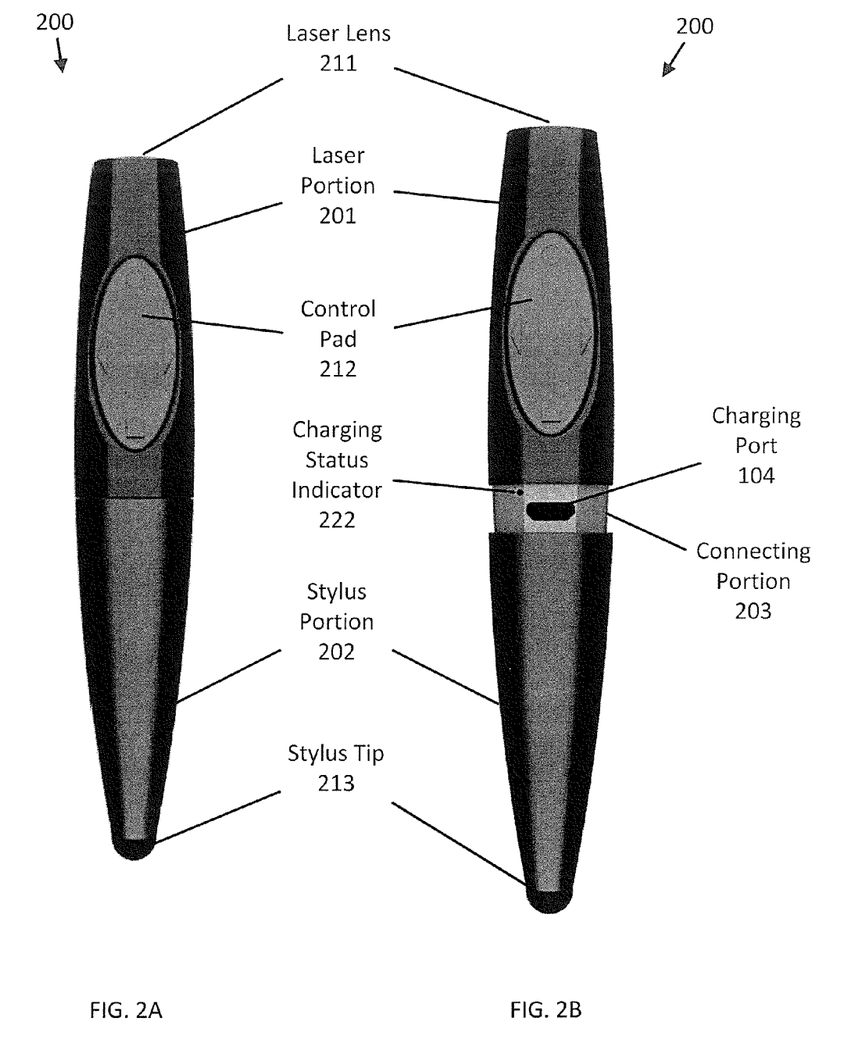
FIG. 2A shows a front top perspective view of an exemplary embodiment of the tablet stylus with presentation interaction functionality in a closed position.
FIG. 2B shows a front top perspective view of an exemplary embodiment of the tablet stylus with presentation interaction functionality in an extended position.

FIG. 2A shows a front top perspective view of an exemplary embodiment of the tablet stylus 200 with presentation interaction functionality in a closed position. The tablet stylus 200 comprises a body having a laser portion 201, a stylus portion 202, and a connecting portion 203 (FIG. 2B). The connecting portion is not shown in FIG. 2A because the tablet stylus is in a closed position. The laser portion and the stylus portion are pushed toward each other such that they appear to be a continuous part of the body of the tablet stylus 200. However, the laser portion and the stylus portion are slidably coupled to a connecting portion 203 (shown in FIG. 2B) such that they can be slid away from each other but still physically coupled to the body of the tablet stylus 200 by the connecting portion 203. When the laser portion 201 and stylus portion 202 are slid away from each other, the tablet stylus 200 is considered to be in an extended position (shown in FIGS. 2B-2E).

FIG. 2B shows a front top perspective view of an exemplary embodiment of the tablet stylus 200 with presentation interaction functionality in an extended position. The connecting portion 203 comprises a charging port 104 and a charging status indicator 222. The charging port (i.e. power interface) 104 may be coupled with an external power supply (not shown) to charge the power source 103 or battery of the table stylus 200. In FIG. 2B, the charging port 104 is a USB input port. The charging status indicator 222 informs the user of the status of the power source 103. For example, the charging status indicator 222 may show a green light when the battery is fully charged, a yellow light when the battery is currently charging, and a red light when the charge is not operating correctly or is failing.

Returning to FIG. 2A, the tablet stylus body comprises a laser lens 211, a control pad 212, and a stylus tip 213. The stylus tip 213 may be made of silicon or other soft material that will not damage, scratch, smudge the display of an electronic device (not shown). Accordingly, the tablet stylus 200 is designed to be used to write, draw, or direct images on an electronic display. The laser lens 211 may be a hole in the body of the tablet stylus 200 which directs the laser light generated by the laser module to where the user points the laser lens 211. As such, a concentrated laser can be generated and pointed out the laser lens 211 to direct an audience's attention to a location as desired by the user. The control pad 212 in FIG. 2 shows a 4 input rocker button that allows one button to contact at least four separate inputs depending on the side of the rocker button the user applies pressure to. These inputs correspond to a command for the presentation to skip to a next slide, back a slide, engage the laser pointer on the tablet stylus 200, and stop the presentation, however, any suitable functionality for a presentation may be implemented using the input buttons and the user inputs should not be limited to the discussion above.

Figure 2C:
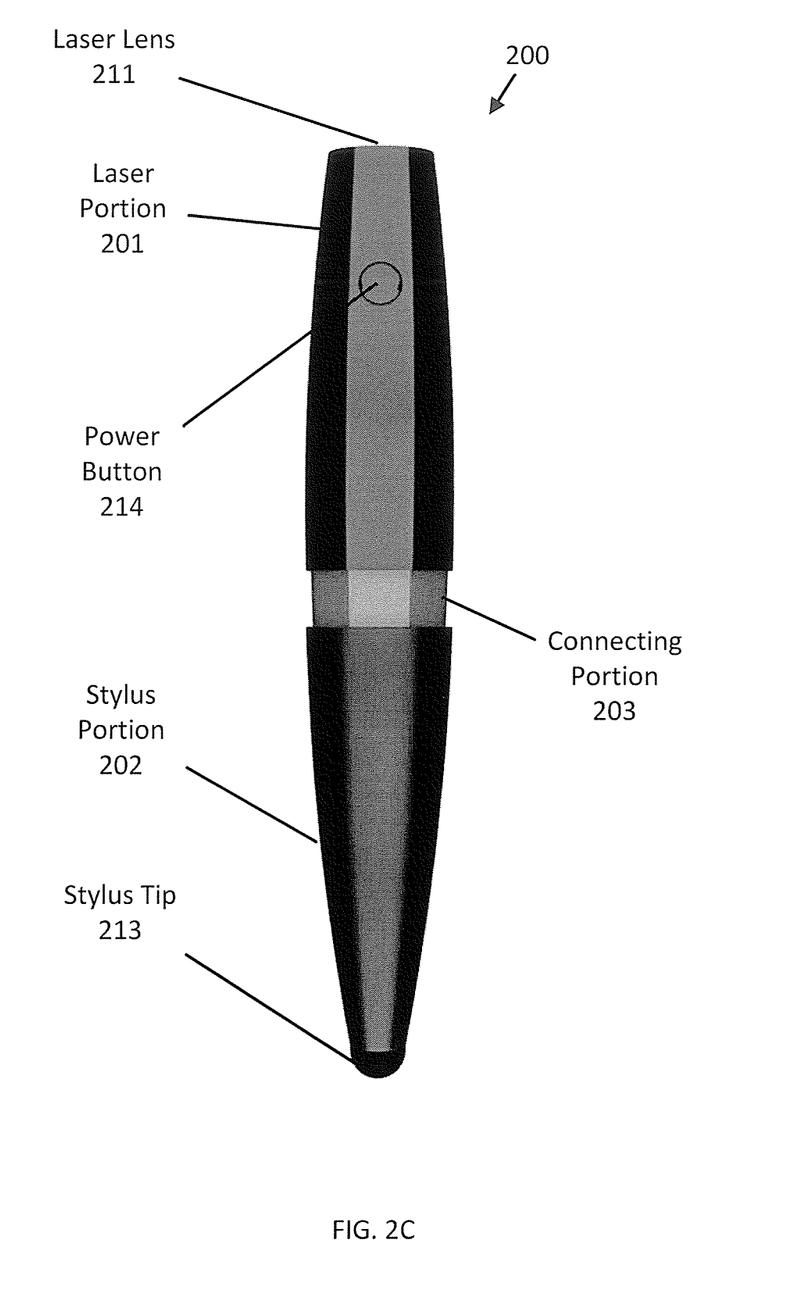
FIG. 2C shows a front bottom perspective view of an exemplary embodiment of the tablet stylus with presentation interaction functionality in the extended position.

FIG. 2C shows a front bottom perspective view of an exemplary embodiment of the tablet stylus 200 with presentation interaction functionality in an extended position. Many of the features shown in FIG. 2C are described above but the power button 214 on the bottom of the tablet stylus 200 allows the user to engage or disengage the power button 214 to turn the tablet stylus 200 functionality on or off.

Figure 2D:
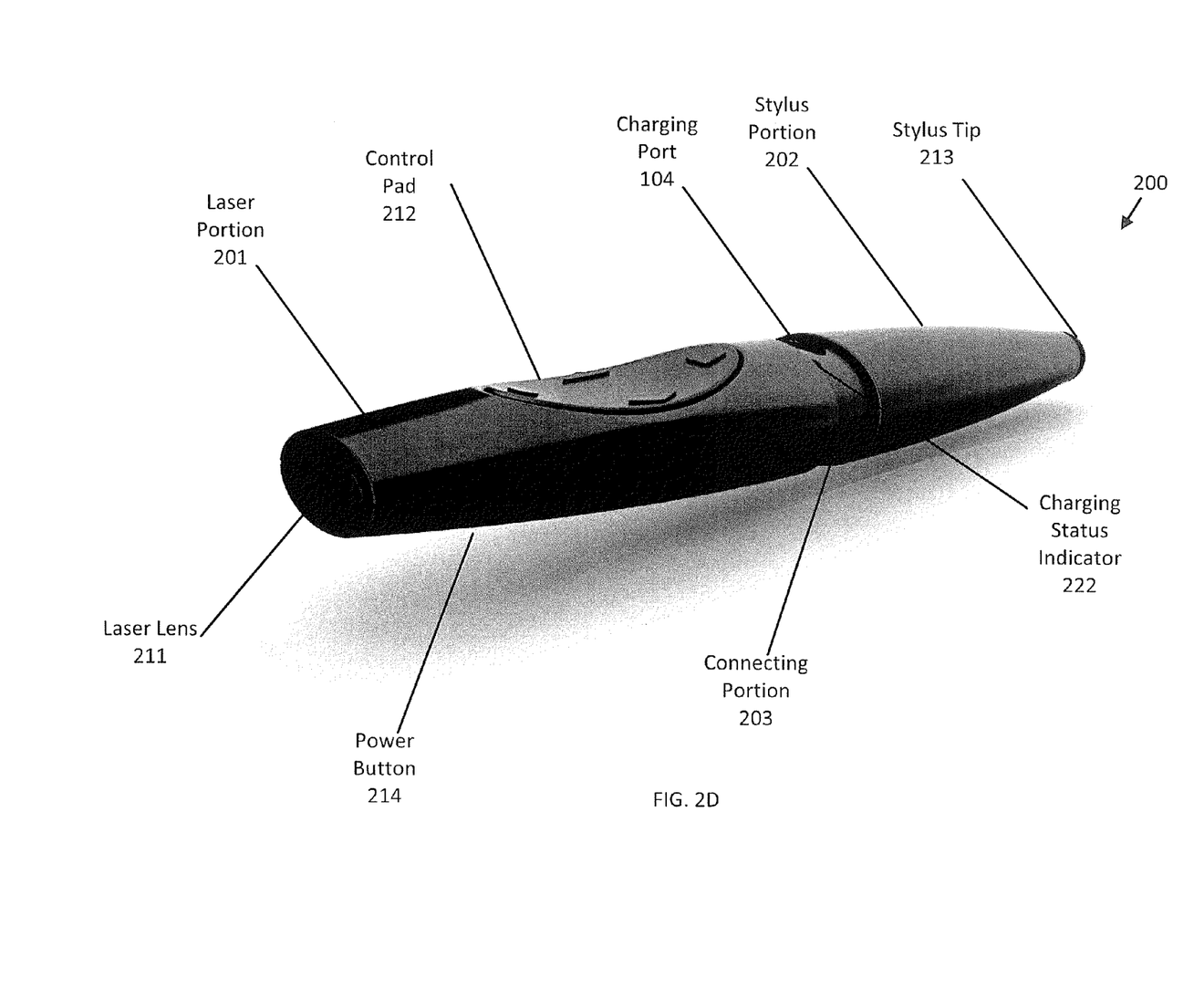
FIG. 2D shows a left front perspective view of an exemplary embodiment of the tablet stylus with presentation interaction functionality in the extended position.
Figure 2E:
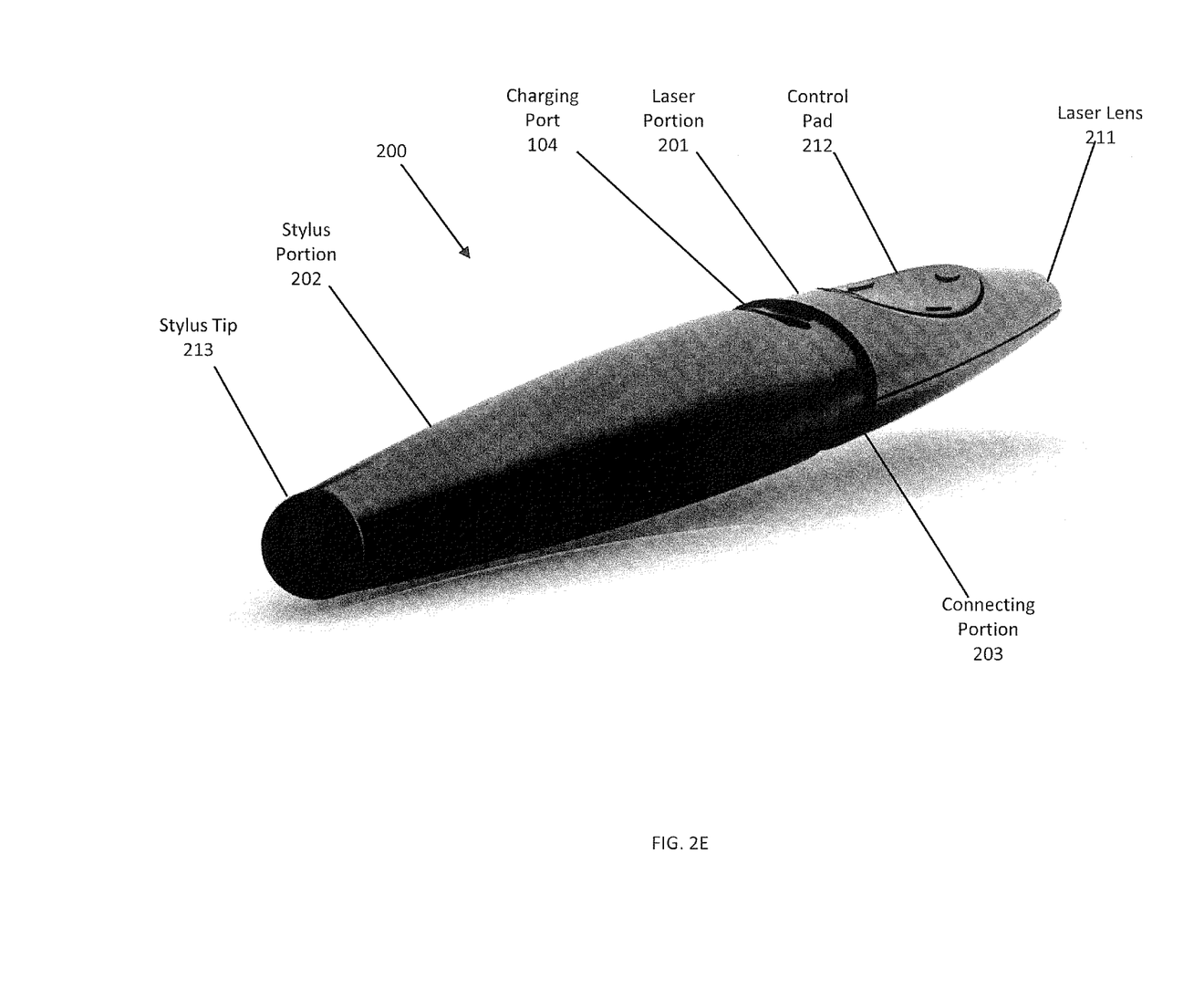
FIG. 2E shows a right rear perspective view of an exemplary embodiment of the tablet stylus with presentation interaction functionality in the extended position.

FIG. 2D shows a left front perspective view of an exemplary embodiment of the tablet stylus 200 with presentation interaction functionality in an extended position. Finally, FIG. 2E shows a right rear perspective view of an exemplary embodiment of the tablet stylus 200 with presentation interaction functionality in an extended position. The components and functionality of the tablet stylus 200 has been described in FIGS. 2A-2C and FIGS. 2D-2E merely provide additional viewpoints of the tablet stylus 200.

Embodiments of the present invention provide a number of advantages including the non-obvious benefits of combining multiple separate components including a laser pointer, human interface device (e.g. Bluetooth™) presentation controller, and stylus into a compact device that is more user-friendly, efficient, and interactive than the original individual components. The combination of the stylus and the presentation functionality into a single compact form factor provides miniaturization of the components and provides increased usability and functionality for the user. The combined function of Bluetooth transmitter and stylus control enable the user to perform presentations on a tablet or smartphone with a single device, without the use of a wireless connection dongle, in a thin and compact design. The device is rechargeable so there is no need to replace batteries, and the charging port may be hidden within the body of the handheld apparatus.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A handheld apparatus comprising:
   a body including:
      a laser portion having a laser lens,
      a stylus portion having a conductive tip, and
      a connection portion coupled to the laser portion and the stylus portion, the connection portion having a charging port,
      wherein the laser portion and the stylus portion are linearly slidable relative to each other between a first position, in which at least one of the laser portion and the stylus portion covers the charging port of the connection portion, and a second position, in which the charging port of the connection portion is exposed;
      wherein the laser portion and the stylus portion remain physically connected together by the connection portion during movement between the first and second positions;
   a power source positioned within the body and coupled to the charging port; and
   a laser module positioned within the laser portion, the laser module operable to output a directed laser through the laser lens;
   wherein the connnection portion includes a charging status indicator that informs the user of the status of the power source.

2. The handheld apparatus of claim 1, wherein the laser portion and the stylus portion slide toward each other to achieve the first position, and wherein the laser portion and the stylus portion slide away from each other to achieve the second position.

3. The handheld apparatus of claim 2, wherein the laser portion and the stylus portion form a continuous body when slid together to the first position.

4. The handheld apparatus of claim 1, wherein the charging port is a USB input port.

5. The handheld apparatus of claim 1, wherein the power source is a rechargeable battery.

6. The handheld apparatus of claim 1, wherein the conductive tip is a stylus tip, and wherein the stylus tip is configured to contact a display of an electronic device without scratching, damaging, or smudging the display.

7. The handheld apparatus of claim 1, wherein the body further includes a control pad supported by one of the laser portion and the stylus portion, and wherein the laser module outputs the directed laser in response to an input by a user on the control pad.

8. The handheld apparatus of claim 7, further comprising:
   a short-range communication module including an antenna; and
   a computer readable medium coupled to a processor, the computer readable medium including a presentation control module configured to send a command to an electronic device using the antenna of the short-range communication module in response to a second input by the user on the control pad, the command controlling a presentation on the electronic device.

9. The handheld apparatus of claim 7, wherein the control pad includes a four button presentation controller interface.

10. The handheld apparatus of claim 9, wherein the four button presentation controller interface is a rocker button.

11. The handheld apparatus of claim 1, further comprising a speaker supported by one of the laser portion and the stylus portion.

12. The handheld apparatus of claim 1, further comprising an accelerometer positioned within the body, wherein the accelerometer is operable to provide gesture control of an electronic device.

13. A handheld apparatus comprising:
   a body including:
      a laser portion having a laser lens,
      a stylus portion having a conductive tip,
      a control pad supported by one of the laser portion and the stylus portion, and
      a connection portion coupled to the laser portion and the stylus portion, the connection portion having a charging port,
      wherein the laser portion and the stylus portion are linearly slidable relative to each other between a closed position, in which at least one of the laser portion and the stylus portion covers the charging port of the connection portion, and an extended position, in which the charging port of the connection portion is exposed;
      wherein the laser portion and the stylus portion remain physically connected together by the connection portion during movement between the closed and extended positions;
   a power source positioned within the body and coupled to the charging port;
   a laser module positioned within the laser portion, the laser module operable to output a directed laser through the laser lens in response to a first input by a user on the control pad;
   a short-range communication module including an antenna; and
   a computer readable medium coupled to a processor, the computer readable medium including a presentation control module configured to send a command to an electronic device using the antenna of the short-range communication module in response to a second input by the user on the control pad, the command controlling a presentation on the electronic device;
   wherein the connection portion includes a charging status indicator that informs the user of the status of the power source.

14. The handheld apparatus of claim 13, wherein the laser portion and the stylus portion form a continuous body when slid together to the closed position.

15. The handheld apparatus of claim 13, wherein the charging port is a USB input port.

16. The handheld apparatus of claim 13, wherein the power source is a rechargeable battery.

17. The handheld apparatus of claim 13, wherein the control pad includes a four button presentation controller interface.

* * * * *